(12) United States Patent
Dany et al.

(10) Patent No.: US 11,560,068 B2
(45) Date of Patent: Jan. 24, 2023

(54) CIRCUIT ARRANGEMENT FOR A VEHICLE ELECTRICAL SYSTEM OF AN ELECTRICALLY DRIVEN MOTOR VEHICLE AND METHOD FOR OPERATING A CIRCUIT ARRANGEMENT OF THIS TYPE

(71) Applicant: STACK HYDROGEN SOLUTIONS GMBH, Aachen (DE)

(72) Inventors: Stefan Dany, Düsseldorf (DE); Jan-Philipp Prote, Aachen (DE); Waldemar Schneider, Esslingen (DE)

(73) Assignee: STACK HYDROGEN SOLUTIONS GMBH, Aachen (DE)

( * ) Notice: Subject to any disclaimer, the term of this patent is extended or adjusted under 35 U.S.C. 154(b) by 0 days.

(21) Appl. No.: 17/603,537

(22) PCT Filed: Apr. 16, 2020

(86) PCT No.: PCT/EP2020/060714
§ 371 (c)(1),
(2) Date: Oct. 13, 2021

(87) PCT Pub. No.: WO2020/212494
PCT Pub. Date: Oct. 22, 2020

(65) Prior Publication Data
US 2022/0203867 A1   Jun. 30, 2022

(30) Foreign Application Priority Data
Apr. 18, 2019   (DE) ..................... 10 2019 110 343.6

(51) Int. Cl.
*H01M 8/04*   (2016.01)
*B60L 58/40*   (2019.01)
(Continued)

(52) U.S. Cl.
CPC ............... *B60L 58/40* (2019.02); *B60L 50/62* (2019.02); *B60L 50/75* (2019.02); *B60L 58/32* (2019.02);
(Continued)

(58) Field of Classification Search
CPC ........... H01M 8/0432; H01M 8/04388; H01M 8/04395; H01M 8/04701; H01M 8/04753; H01M 8/249
See application file for complete search history.

(56) References Cited

U.S. PATENT DOCUMENTS

| 6,972,159 B2 | 12/2005 | Autenrieth |
| 2003/0207156 A1 | 11/2003 | Ovshinsky |

(Continued)

FOREIGN PATENT DOCUMENTS

| CN | 102114789 | 7/2011 |
| CN | 102700427 | 10/2012 |

(Continued)

*Primary Examiner* — Olatunji A Godo
(74) *Attorney, Agent, or Firm* — Fitch, Even, Tabin & Flannery, LLP

(57) ABSTRACT

The invention relates to a circuit arrangement (24) for a vehicle electrical system of an electrically driven motor vehicle (42), comprising: a high-voltage battery (26) for supplying power to an electrical drive machine (28) of the motor vehicle (42); a range extender (22), which is designed to charge the high-voltage battery (26) and which has a plurality of identical fuel-cell base modules (10) having interfaces for supplying reactants in the form of hydrogen and air; a switching device (32) for connecting the range extender (22), the circuit arrangement (42) having no DC-to-DC converter; a control device (36) which is designed to carry out the following steps after the control device has received an activation signal regarding the range extender (22): determining an operating point of the range extender (22) in dependence on at least one variable of the high- (Continued)

Figure 1:
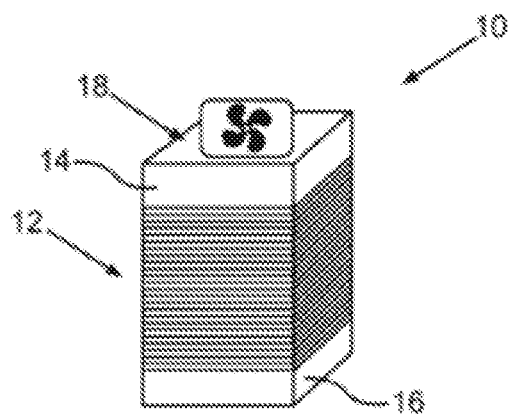

voltage battery (26); defining a setpoint value regarding the supply of the reactants to the fuel-cell base modules (10) and/or a setpoint value regarding an operating temperature of the fuel cells on the basis of the determined operating point; controlling a system (40), which is designed to provide the reactants to and/or to control the temperature of the fuel cells, in accordance with each defined setpoint value; controlling the switching device (34) so as to connect the range extender (22), only after the setpoint value regarding the supply of the reactants and/or the setpoint value regarding the operating temperature has been reached. The invention further relates to an electrically driven motor vehicle (42) having the circuit arrangement (24), and to a method for operating the circuit arrangement (24).

19 Claims, 4 Drawing Sheets

(51) Int. Cl.
| | | |
|---|---|---|
| *B60L 50/62* | (2019.01) | |
| *B60L 50/75* | (2019.01) | |
| *B60L 58/32* | (2019.01) | |
| *H01M 8/0432* | (2016.01) | |
| *H01M 8/0438* | (2016.01) | |
| *H01M 8/04701* | (2016.01) | |
| *H01M 8/04746* | (2016.01) | |
| *H01M 8/249* | (2016.01) | |
| *H01M 10/44* | (2006.01) | |
| *H01M 10/46* | (2006.01) | |
| *H01M 16/00* | (2006.01) | |

(52) U.S. Cl.
CPC ..... *H01M 8/0432* (2013.01); *H01M 8/04388* (2013.01); *H01M 8/04395* (2013.01); *H01M 8/04701* (2013.01); *H01M 8/04753* (2013.01); *H01M 8/249* (2013.01); *H01M 10/44* (2013.01); *H01M 10/46* (2013.01); *H01M 16/006* (2013.01); *B60L 2240/36* (2013.01); *B60L 2240/547* (2013.01); *B60L 2240/60* (2013.01); *B60L 2250/18* (2013.01); *H01M 2220/20* (2013.01); *H01M 2250/20* (2013.01)

(56) References Cited

U.S. PATENT DOCUMENTS

| | | | |
|---|---|---|---|
| 2010/0167098 A1* | 7/2010 | Furukawa | H01M 8/04388 |
| | | | 429/442 |
| 2011/0111318 A1 | 5/2011 | Bernard | |
| 2014/0312845 A1 | 10/2014 | Scheucher | |
| 2016/0141673 A1 | 5/2016 | Kakeno | |
| 2016/0204455 A1 | 7/2016 | Kemmer | |
| 2018/0236894 A1 | 8/2018 | Bandai | |
| 2018/0241057 A1 | 8/2018 | Schuerer | |
| 2021/0206290 A1 | 7/2021 | Li | |

FOREIGN PATENT DOCUMENTS

| | | |
|---|---|---|
| CN | 103507656 | 1/2014 |
| DE | 102007035217 | 1/2009 |
| DE | 102015015229 | 6/2016 |
| DE | 102015016372 | 8/2016 |
| WO | 2019/041383 | 3/2019 |

\* cited by examiner

CIRCUIT ARRANGEMENT FOR A VEHICLE ELECTRICAL SYSTEM OF AN ELECTRICALLY DRIVEN MOTOR VEHICLE AND METHOD FOR OPERATING A CIRCUIT ARRANGEMENT OF THIS TYPE

CROSS-REFERENCE TO RELATED APPLICATIONS

This application is a § 371 national stage entry of International Application No. PCT/EP2020/060714, filed on Apr. 16, 2020, which claims priority to German Patent Application No. 10 2019 110 343.6, filed on Apr. 18, 2019, the entire contents of which are incorporated herein by reference.

The present invention concerns a circuit arrangement for an on-board network of an electrically driven motor vehicle, an electrically driven motor vehicle with such a circuit arrangement and a method for operating such a circuit arrangement.

Electrically driven motor vehicles often still have a relatively limited range due to the current energy density of high-voltage batteries. To extend the range, it is known per se to use so-called range extenders in electric vehicles in order to increase the range. The range extenders currently most frequently used, have internal combustion engines that drive a generator, which in turn supplies the high-voltage battery and/or the electric motor with electricity.

In addition, range extenders are also known which have a plurality of fuel cells. One advantage of these range extenders is that they are virtually emission-free, since hydrogen and oxygen usually react to form water. Typically, such fuel cell-based range extenders require one or more compressors to supply compressed air to the fuel cells. The compressors have to be adapted to the respective range extender in a relatively complex manner. Furthermore, the electrical interconnection of such fuel cell-based range extenders with a high-voltage battery is relatively expensive.

It is therefore the object of the present invention to provide a solution by means of which range extenders based on fuel cells can be used in a particularly simple and unproblematic manner to extend the range of an electrically driven motor vehicle.

This object is achieved by the subjects of the independent claims. Further possible embodiments of the invention are specified in the dependent claims.

The circuit arrangement according to the invention for an on-board network of an electrically driven motor vehicle comprises a high-voltage battery for supplying energy to an electrical engine of the motor vehicle. Furthermore, the circuit arrangement comprises a range extender designed for charging the high-voltage battery, having a plurality of identical fuel cell base modules each with a plurality of fuel cells connected in series and interfaces for supplying reactants in the form of hydrogen and air. The interfaces may also be designed to discharge water and residual gas from the fuel cell base modules.

The range extender may be based on a modular range extender system, which comprises a plurality of, in particular identically structured, fuel cell base modules, each of which has a plurality of fuel cells connected in series and interfaces for supplying hydrogen and air and for removing water and residual gas. Furthermore, the modular range extender system comprises a media supply device which is designed to supply air and hydrogen via the interfaces to the fuel cell base modules and to discharge water and residual gas from the fuel cell base modules via the interfaces. To provide different powers and/or voltages, different numbers of the fuel cell base modules are electrically connectable to each another in different series and/or parallel circuits and configurable with the media supply device to form respective variants of a range extender. The range extender of the circuit arrangement may be a specific configuration or variant based on the range extender system.

It is essential in the modular range extender system that the individual fuel cell base modules are scalable by means of a corresponding combination, as required for each application, to an overall system, i.e. a specific variant of a range extender. By corresponding connection in parallel and connection in series of the individual fuel cell base modules, different variants of a range extender may be configured, which differ, for example, regarding the available power, but, for example, may provide the same high voltage. Of course, it is also possible for the fuel cell base modules to be interconnected in such a way that the available voltages differ in different variants of the range extender.

The fuel cell base modules may also include a wide variety of peripheral and system components that are integrated into the respective fuel cell base modules for a highly independent function. In particular it is possible, with a configuration of the modular range extender system that is appropriately adapted to a particular boundary condition, to achieve a particularly long lifetime and efficiency for the variant of the range extender in question. It is thus possible, inter alia, that a design, adapted to the boundary conditions with defined operating points of the relevant variant of the range extender, may be achieved. In particular, it is also possible to design the respective variants of the range extender for a partial load range.

The individual fuel cell base modules may, for example, have a reactive area of approx. 100 $cm^2$ and approx. 80 fuel cells. Of course, it is also possible to design the number and area of the bipolar plates and the number of fuel cells differently. The fuel cells connected in series for each basic fuel cell module may, for example, provide an open circuit voltage of 80 V and a voltage of 48 V in full load operation. However, depending on the design of the fuel cell base modules, other open circuit voltages and other operating points are also possible.

Using the modular range extender system, for example, it is possible to configure very different variants of a fuel cell-based range extender for very different vehicle types. For example, a particularly powerful variant of a range extender may be provided for an electrically powered commercial vehicle, and it is also possible, for example, to configure a less powerful variant of a range extender for an electrically powered small car based on the same fuel cell base modules. The individual fuel cell base modules only need to be developed, tested and approved once. The various variants of the range extenders mentioned may then be configured on the basis of the preferably standardized fuel cell base modules.

In particular, on the basis of the modular range extender system, it is possible to configure a fuel cell-based range extender for a specific electric vehicle, which may be connected in parallel to a high-voltage battery of the electric vehicle without the interposition of a direct current voltage converter. The usually quite expensive direct current voltage converter can therefore be dispensed with. Therefore, the voltage level of the appropriately configured range extender based on the modular range extender system may easily be adapted to the voltage level of the relevant high-voltage battery by simply interconnecting the individual fuel cell base modules in series and parallel circuits.

In addition, the circuit arrangement comprises a switching device for connecting the range extender, which is designed to connect the high-voltage battery and the range extender in an electrically conductive manner without a direct current voltage converter in the form of a parallel circuit. In other words, the circuit arrangement does not comprise a direct current voltage converter in order to adjust the respective voltages of the high-voltage battery and the range extender to one another. A respective voltage level of the range extender is thus achieved when the range extender is connected, from the respective voltage level of the high-voltage battery, which is determined, among other things, by the charging state of the high-voltage battery.

The circuit arrangement according to the invention also comprises a control device which is arranged to carry out the following steps after it has received an activation signal relating to the range extender:

determining an operating point of the range extender as a function of at least one quantity of the high-voltage battery;

defining a respective setpoint value relating to a supply of the reactants to the fuel cell base modules and/or an operating temperature of the fuel cells based on the determined operating point;

controlling a system designed for providing the reactants and/or for regulating the temperature of the fuel cells corresponding to the respective defined setpoint value;

controlling the switching device for connecting the range extender, only after the respective setpoint value relating to the supply of the reactants and/or the operating temperature has been reached.

Because the circuit arrangement according to the invention dispenses with a direct current voltage converter, it is essential that the range extender has the necessary reactants available before connecting, or at the latest at the point in time of connecting, and/or that the fuel cells of the range extender have a sufficient operating temperature. The control device can be designed to receive and evaluate a wide variety of data relating to a wide variety of quantities of the high-voltage battery, for example from a sensor device of the motor vehicle. The control device can also receive temperature data relating to the fuel cells from this sensor device.

The invention is based on the knowledge that the operating point of the range extender depends significantly on different quantities of the high-voltage battery, especially since the circuit arrangement does not have a direct current voltage converter. The high-voltage battery is therefore leading regarding a respective operating point of the range extender at the point in time the range extender is connected and also afterwards regarding a voltage that is being set when the range extender is connected and thus also regarding an operating point of the range extenders that is being set. The voltage applied to the high-voltage battery depends largely on the charging state of the high-voltage battery. The voltage applied to the high-voltage battery may also depend, for example, on whether the high-voltage battery is currently being discharged or—for example, due to recuperation—is being charged.

The control device is arranged, after receiving the activation signal relating to the range extender, to evaluate at least one variable of the high-voltage battery, preferably a plurality of quantities of the high-voltage battery, and to determine an associated operating point of the range extender as a function thereof. Based on the determined operating point of the range extender, the control device can define a respective setpoint value relating to a supply of the reactants, i.e. the hydrogen and the air, which are required such that the fuel cell base modules and thus the range extender can reliably be at the determined operating point. In this context, the invention is based on the knowledge that the provision and supply of said reactants to the respective fuel cell base modules up to the respective fuel cells exhibits a certain inertia. This also applies to the appropriate setting of the operating temperature of the fuel cells, in particular matched to the determined operating point. The reactions within the respective fuel cells depend largely on their current temperature. In particular, at low outside temperatures, the case may arise that the fuel cells have a very low temperature, which may be far below a favourable operating temperature, such that the range extender would be ready for use for the determined operating point.

Before the range extender is connected, the control device may control a system which is designed to provide the reactants and to supply them to the respective fuel cell base modules. The system may also be designed to regulate the temperature of the respective fuel cells, in particular for cooling, as well as for heating. The control device is arranged to control the switching device for connecting the range extender only after the respective setpoint value relating to the supply of the reactants and/or the operating temperature has been reached.

Because the control device is arranged to carry out said steps, it is also possible without a problem to operate the range extender and the high-voltage battery in parallel without a direct current voltage converter. Because the control device can determine the operating point of the range extender in said manner and set the setpoint values based thereon, the control device can ensure that, by appropriate control of the system designed to provide the reactants and/or to regulate the temperature of the fuel cells, at the latest at the point in time of connecting the range extender, it will be supplied with the corresponding reactants and/or it will have the operating temperature, such that the range extender can be operated at the determined operating point without being damaged.

After the range extender has been connected, it can therefore be ensured in any case that the respective fuel cells are supplied with the reactants to a sufficient extent, such that in particular an at least substantially homogeneous supply of the reactants to the respective fuel cells can be ensured. The respective reactions within the fuel cells can thus proceed at least almost in the same way regarding the fuel cells themselves and also regarding the entire range extender. Excessive stress and possibly damage to the range extender can thus be reliably counteracted. In addition, as soon as it is connected, the range extender is able to charge the high-voltage battery sufficiently without the range extender being damaged as a result. By ensuring the appropriate operating temperature within the respective fuel cells, it can also be ensured that the temperature-dependent reactions within the fuel cells can take place in such a way that, on the one hand, the high-voltage battery is reliably charged and, on the other hand, the range extender is not damaged.

The control device is also arranged, for example using current actual data relating to one or more quantities of the high-voltage battery, to determine or estimate an associated operating point of the range extender for a future point in time for connection of the range extender. The required amount of reactants and/or the required operating temperature within the fuel cells can be determined by means of the control device to match the determined operating point. Because the control device can set the supply of the reactants and/or the regulation of the temperature of the fuel cells, matched to the determined operating point, and only cause the range extender to be connected when the respective setpoint values have been reached, it can be ensured immediately after connecting the range extender in a particularly simple and unproblematic manner that in this way a range extension of the electrically driven motor vehicle in question can be achieved.

In particular, it can be ensured that at the point in time the range extender is connected, a voltage applied to it corresponds at least essentially to the voltage applied to the high-voltage battery. When the switching device for connecting the range extender is actuated by the control device, it is ensured that the range extender and the high-voltage battery have at least essentially the same voltage level, even without said direct current voltage converter. By making the reactants available within the respective fuel cells in accordance with the determined operating point, in particular in combination with the appropriate temperature regulation of the fuel cells in advance, the power output of the range extender can be set to suit the charging requirements of the high-voltage battery immediately after the range extender is connected.

The circuit arrangement according to the invention, due to the savings or due to the omission of the direct current voltage converter, has a particularly simple and thus cost-effective structure. Due to the described properties of the control device, it is nevertheless possible to connect the range extender, if necessary, to charge the high-voltage battery and thus to extend the range of the motor vehicle in question. An intrinsic system inertia of the range extender based on fuel cells compared to the high-voltage battery can be compensated for by providing the reactants in good time and/or by setting the appropriate operating temperature of the fuel cells in good time, namely before the range extender is connected. At the point in time it is connected, the range extender can therefore be operated directly at the appropriate operating point, matched to the current state of the high-voltage battery. This makes it possible, a.o., to connect the range extender for range extension whenever it is necessary without an excessive loading and/or damaging of the range extender. Thereby, it is irrelevant whether the activation signal relating to the range extender is generated based on an activation request by the driver or automatically.

A possible embodiment of the invention provides that the control device is arranged to monitor the respective volume flows of the hydrogen and the air to the fuel cell base modules and only then to control the switching device for connecting the range extender when the volume flows correspond to the specified setpoint values. In other words, it is also possible that said setpoint values relating to the reactants relate to setpoint values relating to the respective volume flows of the hydrogen and the air to the individual fuel cell base modules. The control device can be supplied with corresponding data, for example by means of the sensor device already mentioned, which characterise the respective and instantaneous volume flows of the reactants to the fuel cell base modules. For example, it is possible in this way to record the respective volume flows of the reactants directly at said interfaces of the fuel cell base modules and to provide the control device with the relevant data. Only when the control device establishes or ascertains that said volume flows correspond to the specified setpoint values does the control device trigger the switching device for connecting the range extender. It can thus be reliably ensured that the individual fuel cells of the fuel cell base modules are supplied with the reactants to a sufficient extent at the point in time the range extender is connected, matched to the determined operating point of the range extender.

Another possible embodiment of the invention provides that the control device is arranged to determine a difference between an actual temperature of the fuel cells and the specified setpoint value relating to the operating temperature of the fuel cells and, depending on the determined difference, set a temperature and/or a volume flow of a fluid of a temperature regulation device of the range extender. The temperature regulation device can be part of the previously mentioned system, which is designed to regulate the temperature of the fuel cells. The previously mentioned sensor device, for example, may have individual sensors, which are designed to measure the respective actual temperatures of the fuel cells and to provide the control device with the relevant data. Knowing a respective deviation between the actual temperatures of the fuel cells and the specified setpoint value relating to the operating temperature of the fuel cells, the control device can regulate the fluid of the temperature regulation device, for example, to such a temperature that the setpoint value for the operating temperature of the fuel cells can be reached particularly quickly by means of the fluid. In addition, the control device can be arranged, as a function of the respective temperature deviation from the operating temperature, to set the volume flow of the fluid of the temperature regulation device in such a way that the operating temperature of the fuel cells is reached particularly quickly. A usually favourable operating temperature of the fuel cells can be, for example, in the range of 60° C. If the respective difference between the actual temperature of the fuel cells and the specified setpoint value for the operating temperature is particularly high, the control device can, for example, set the fluid of the temperature regulation device to a particularly high value, as well as the volume flow. As a result, the operating temperature of the fuel cells can be reached particularly quickly, such that the range extender can also be connected particularly early after the activation signal has been received.

According to a further possible embodiment of the invention, it is provided that the control device is arranged, as a function of a voltage of the high-voltage battery, to determine the operating point of the range extender. The invention is based on the knowledge that the voltage of the high-voltage battery has a significant influence on the operating point of the range extender, especially since the circuit arrangement dispenses with a direct current voltage converter between the range extender and the high-voltage battery. Knowing the instantaneous voltage of the high-voltage battery, the control device can precisely determine the associated or suitable operating point of the range extender. This in turn leads to the fact that the supply and provision of the reactants and/or the operating temperature of the fuel cells can be adapted precisely to the current voltage level of the high-voltage battery before the range extender is connected.

Another possible embodiment of the invention provides that the control device is arranged, as a function of a charging state of the high-voltage battery, to determine the operating point of the range extender. Usually, the voltage applied to the high-voltage battery also largely depends on the charging state of the high-voltage battery. Because the direct current voltage converter has been omitted, it is therefore essential to know the charging state of the high-voltage battery in order to determine the appropriate operating point of the range extender. The charging state of the high-voltage battery can in turn be determined, for example, by measuring the voltage on the high-voltage battery.

Another possible embodiment of the invention provides that the control device is arranged, as a function of an operating state of the high-voltage battery, to determine the operating point of the range extender and/or to determine the setpoint values. The invention is based on the knowledge that high-voltage batteries, during regular drive mode, may have a wide variety of operating states, for example regarding their power output or power consumption, as well as, for example, relating to the respective temperature of the high-voltage battery. The control device can also be arranged to evaluate a wide variety of quantities which characterise or describe a respective operating state of the high-voltage battery. Knowing the operating state of the high-voltage battery, it is particularly reliably possible to determine the appropriate operating point of the range extender and/or to define said setpoint values matching the determined operating point and thus also to set them in good time before the range extender is connected.

According to a further possible embodiment of the invention, it is provided that the control device is arranged, regarding the operating state of the high-voltage battery, to determine whether and how much the high-voltage battery is being discharged or charged. In this context, the invention is based on the knowledge that a voltage applied to the high-voltage battery or a voltage provided by means of it can depend significantly on whether the high-voltage battery is being discharged or charged. If, for example, the motor vehicle in question is currently being accelerated very strongly, then the high-voltage battery is discharged particularly strongly, as a result of which a voltage on the high-voltage battery may correspondingly decrease. For example, if a driver takes his foot off the gas pedal, then the high-voltage battery can be charged by recuperation, as a result of which the voltage available or applied to the high-voltage battery can increase compared to a discharging process. The control device thus receives data that characterise whether and how much the high-voltage battery is being discharged or charged. Based on this, the control device can determine or estimate the associated operating point of the range extender particularly reliably. For example, it is also possible for the control device to be provided with data which characterise the driving behaviour of a current driver of the motor vehicle and/or a route profile that has just been travelled. Knowing this data or information, the control device can also predictively determine or estimate whether and how much the high-voltage battery will be discharged or charged in the future. In addition, the control device can be provided with data which characterise how long it takes to achieve said setpoint values. In combination of these data or information, the control device can determine or estimate the operating point of the range extender particularly precisely for a possible point in time when the range extender is connected, as a result of which the setpoint values for this point in time can be set particularly appropriately.

In a further possible embodiment of the invention, it is provided that the control device is arranged, as a function of data that characterise a route profile of the motor vehicle and/or a fleet profile of a plurality of motor vehicles, to determine the operating point of the range extender and/or to define the setpoint values. Using the aforementioned route profile and/or fleet profile, it is possible, for example, for the control device to estimate for future points in time how different quantities of the high-voltage battery will change. Based on this, the control device can particularly reliably determine the appropriate or associated operating point of the range extender and/or determine the corresponding associated setpoint values. It is thus possible, for example, to provide the control device with data which characterise a height profile of a route currently being travelled by the motor vehicle. In this way, information can be provided, for example, as to when the motor vehicle will most likely demand a particularly high amount of power from the high-voltage battery along the route, or when the high-voltage battery will be charged, for example by means of recuperation. Knowing this data or information, it is in turn possible to estimate an associated operating point of the range extender particularly precisely.

According to a further possible embodiment of the invention, it is provided that the control device is arranged, as a function of data which characterise the driving behaviour of a driver of the motor vehicle, to determine the operating point of the range extender and/or to determine the setpoint values. Knowing the driving behaviour of the driver, it is possible for the control device to estimate a power requirement of the motor vehicle in a particularly reliable manner, and thus also a power requirement regarding the high-voltage battery and/or the range extender. In this way, the control device can particularly predictively estimate or determine what the operating point of the range extender will be for the point in time when the range extender is connected and thus set the setpoint values and/or the operating temperature.

Another possible embodiment of the invention provides that the control device is arranged to set the setpoint values relating to the reactants higher by a specified amount than is necessary for the determined operating point of the range extender. This ensures that the range extender always has sufficient power reserves when it is connected. If, for example, a power requirement of the motor vehicle after connecting the range extender turns out to be somewhat greater than previously estimated by the control device, the overstoechiometric setting of the setpoint values for the reactants regarding the determined operating point can still provide the range extender with sufficient power and also maintain or show a voltage level which corresponds to the voltage level of the high-voltage battery.

According to a further possible embodiment of the invention, it is provided that the control device is arranged, after connecting the range extender, to compare the previously determined operating point with an actually established operating point of the range extender and, depending thereon, to adjust the supply of hydrogen and air to match the actual operating point. Thus, it can be ensured that, early after the range extender has been connected—if necessary—the supply of the reactants is adjusted to the actual operating point of the range extender.

According to a further possible embodiment of the invention, it is provided that the control device is arranged, based on a current which characterises a current flowing from the range extender to the high-voltage battery, to determine the actual operating point of the range extender. Using the current actually flowing from the range extender to the high-voltage battery, it is possible in a particularly reliable manner to determine the actual operating point of the range extender.

Another possible embodiment of the invention provides that the control device is arranged to determine a state of the fuel cell base modules and to specify different setpoint values for respective groups of fuel cell base modules connected in parallel, depending on the state of their fuel cell base modules. The state can comprise, for example, a respective temperature and/or a respective aging state of the fuel cell base modules. In this context, the invention is based on the knowledge that the temperature has an exponential influence on the reactions taking place in the fuel cells and thus also on the voltage development during the operation of the respective fuel cells. In this context, the invention is also based on the knowledge that the respective aging state of the fuel cells and thus of the associated fuel cell base modules has a significant influence on the performance and thus also on the voltage development. The respective groups of the fuel cell base modules connected in parallel may therefore, before the range extender is connected, precisely be supplied for their respective state with the appropriate amount of reactants and/or, regarding their operating temperature, may be appropriately temperature-regulated on their respective state. It can thus be ensured that the respective groups of the fuel cell base modules connected in parallel are set to be the same, in particular regarding their voltage. This in turn helps to ensure that the individual fuel cells are stressed as little as possible.

Another possible embodiment of the invention provides that the range extender is designed according to the following formula:

$$Z_{BZ,R} = \frac{Z_{Bar,R} * U_{Z,Bat,min}}{U_{Z,BZ,VL}}$$

wherein $Z_{BZ,R}$ denotes the number of all in series connected fuel cells of the range extender, $Z_{Bat,R}$ denotes the number of all in series connected battery cells of the high-voltage battery, $U_{Z,Bat,min}$ denotes a minimum permissible cell voltage of the high-voltage battery during operation, $U_{Z,BZ,VL}$ denotes a fuel cell operating voltage at cell level at full load.

A design of the range extender according to the above formula ensures that the voltage level of the fuel cells or the range extender is never below the voltage level of the high-voltage battery. This means that it is ensured that the two voltage levels, hence of the range extender and high-voltage battery, match each other for the operating point described above and the connection.

Another possible embodiment of the invention provides that the range extender is designed according to the following formula:

$$A_{BZ} = \frac{P_M}{Z_{BZ,R}} * J_{BZ,MEA},$$

wherein $A_{BZ}$ denotes a reactive area of all fuel cells of the range extender, $P_M$ denotes an average specified power requirement of the motor vehicle, $Z_{BZ,R}$ denotes again the number of all in series connected fuel cells of the range extender, $J_{BZ,MEA}$ denotes a maximum permissible current density of the respective membrane-electrode units of the range extender.

A design of the range extender according to this formula, in particular in conjunction with the other formula mentioned first, ensures that the fuel cells and thus the range extender is neither oversized nor undersized for the application, i.e. based on the specified average power requirement of the motor vehicle. The focus here is particularly on ensuring that the range extender can ensure that the current is sufficient for the application.

Another possible embodiment of the invention provides that the average specified power requirement of the motor vehicle comprises an average power requirement of the engine of the motor vehicle for a specified driving profile of the motor vehicle and at least one auxiliary consumer of the motor vehicle, in particular an air conditioning device of the motor vehicle. For the specified driving profile, for example, data can be stored which characterise a time-varying power requirement of the engine of the motor vehicle, wherein the control device, for example, based on this data, is able to determine said average power requirement of the engine of the motor vehicle, in order to be able to take into account the specified driving profile. In addition, at least one power requirement of a secondary consumer of the motor vehicle, in particular in the form of an air conditioning device of the motor vehicle, can also be taken into account. In this regard, the control device can, for example, be provided with averaged data on the power requirement of the air-conditioning device of the motor vehicle, on the basis of which the control device can estimate whether the motor vehicle needs to be heated or cooled by means of the air-conditioning device while driving. This can be subject to regional differences. For example, the range extender can be designed differently for vehicle models that are used in different climate zones—e.g. in Scandinavia or southern Europe. In particular, when the motor vehicle has to be cooled, there is an increased power requirement for the air-conditioning device, since no waste heat from the range extender can be used for this, for example. Knowing the average power requirement of the engine and the power requirement of at least one secondary consumer of the motor vehicle, which is particularly energy-hungry, for example, the design of the range extender can be designed particularly appropriately regarding the required reactive area of all fuel cells of the hydrogen range extender. In this way, it can be ensured that the range extender is neither oversized nor undersized in order to be able to contribute to extending the range of the electrically driven motor vehicle in question.

The electrically driven motor vehicle according to the invention comprises the circuit arrangement according to the invention or an advantageous embodiment of the circuit arrangement according to the invention.

In the method according to the invention for operating the circuit arrangement according to the invention or a possible embodiment of the circuit arrangement, the control device of the circuit arrangement carries out the following steps after it has received an activation signal relating to the range extender:

determining an operating point of the range extender as a function of at least one quantity of the high-voltage battery;

defining a respective setpoint value relating to a supply of the reactants to the fuel cell base modules and/or an operating temperature of the fuel cells based on the determined operating point;

controlling a system designed for providing the reactants and/or for regulating the temperature of the fuel cells corresponding to the respective defined setpoint value;

controlling the switching device for connecting the range extender, only after the respective setpoint value relating to the supply of the reactants and/or the operating temperature has been reached.

Possible embodiments of the circuit arrangement according to the invention are to be regarded as possible embodiments of the method according to the invention and vice versa, the circuit arrangement in particular having means for carrying out the method steps.

Further possible advantages, features and embodiments of the invention are described with reference to the following figures. The features and feature combinations mentioned above in the description as well as the features and feature combinations shown below in the description of the figures and/or in the figures alone can be used not only in the respectively specified combination, but also in other combinations or alone, without departing from the scope of the invention.

Figure 2:
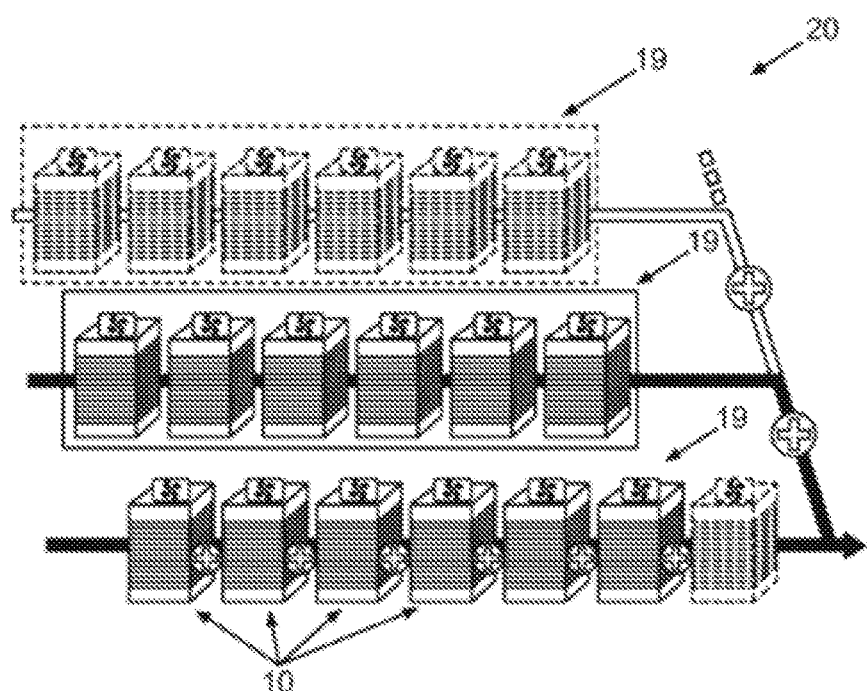
Figure 3:
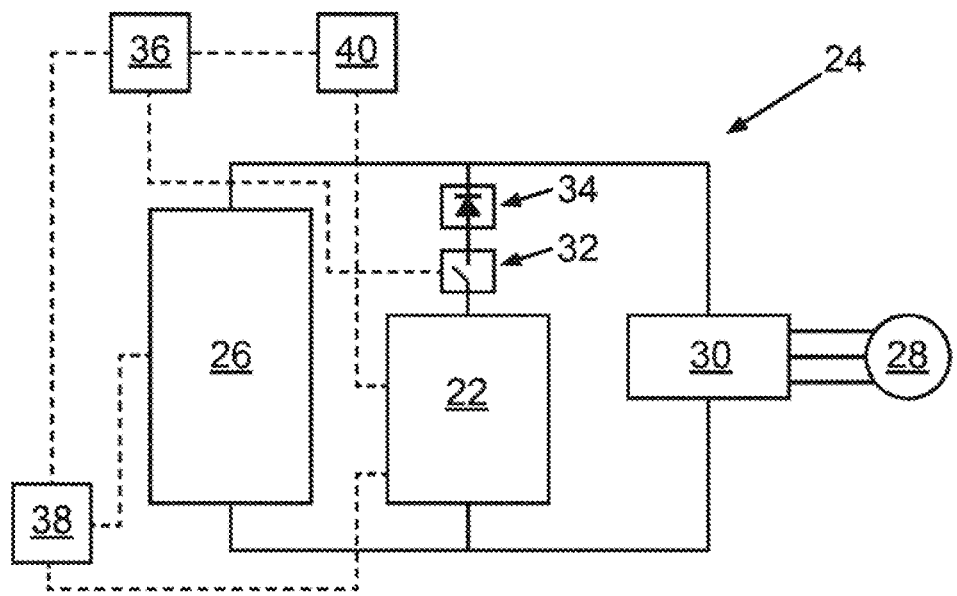
Figure 4:
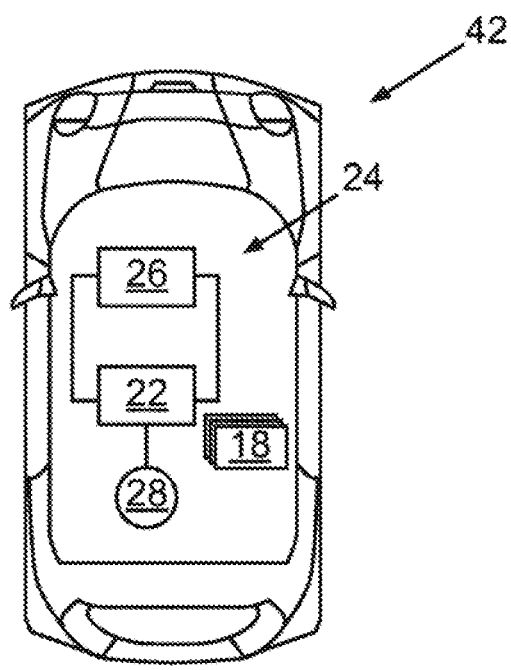
Figure 5:
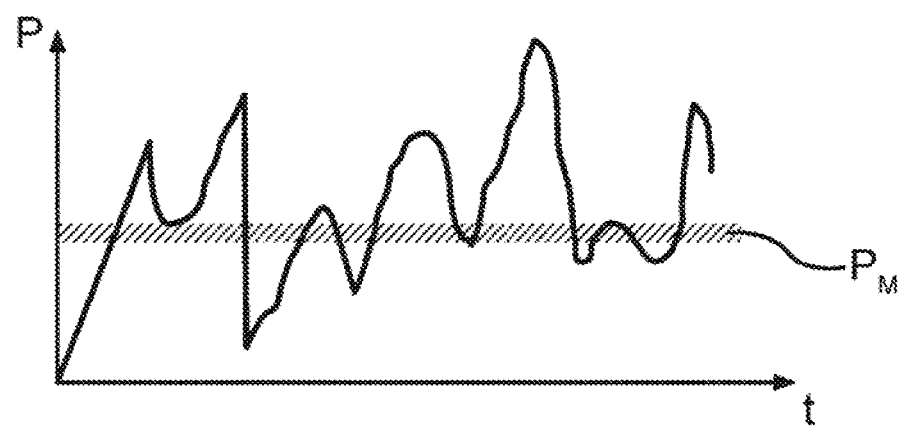
Figure 6:
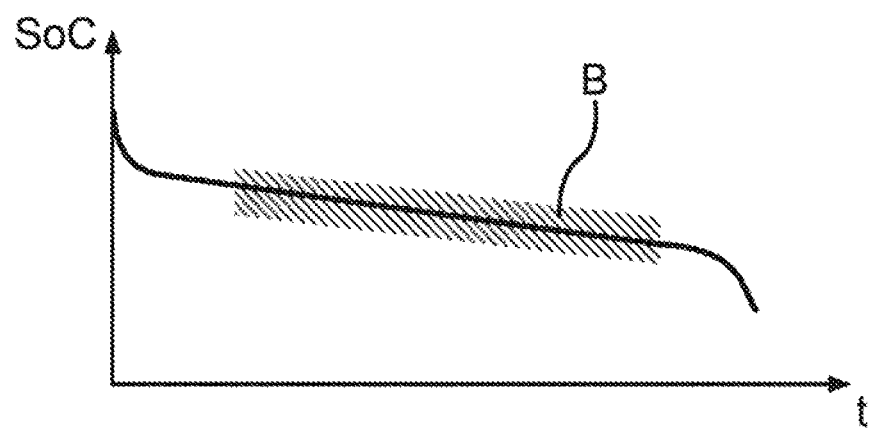
Figure 7:
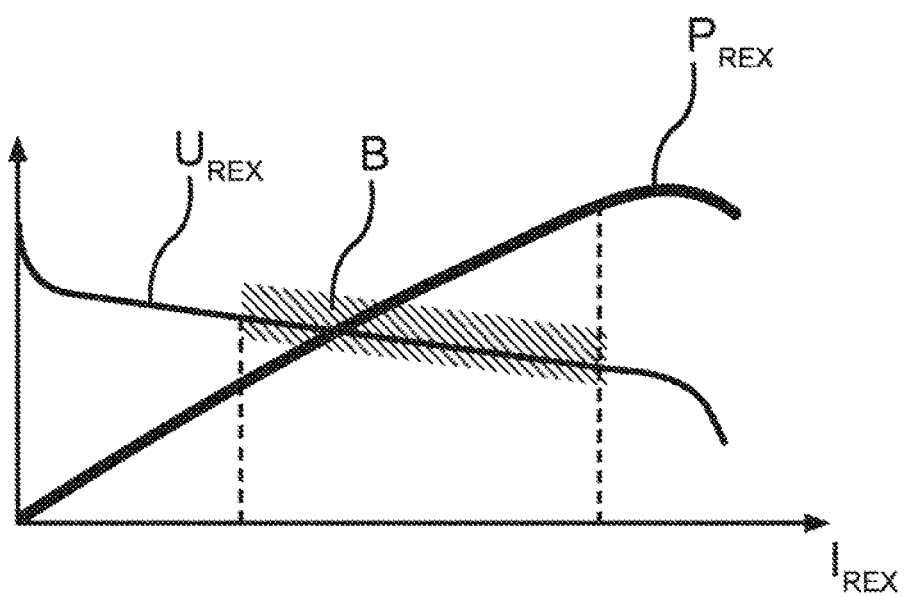

The drawing shows in:

FIG. 1 a schematic perspective view of a fuel cell base module which has a plurality of fuel cells connected in series and to which a compressor for supplying air is assigned;

FIG. 2 a schematic representation of a plurality of fuel cell base modules, which combined in groups are connected in series, some of these groups in turn being interconnected in parallel;

FIG. 3 a schematic representation of a circuit arrangement for an on-board network of an electrically driven motor vehicle, the circuit arrangement comprising a parallel connection of a variant of a range extender formed from the fuel cell base modules and a high-voltage battery;

FIG. 4 a schematic representation of an electrically driven motor vehicle having the circuit arrangement;

FIG. 5 a diagram in which an instantaneous power requirement of the motor vehicle over time and an average power requirement of the motor vehicle are schematically shown;

FIG. 6 a diagram in which a course of the charging state of the high-voltage battery of the motor vehicle is shown;

FIG. 7 a diagram in which respective curves of a voltage and a power output of the range extender are schematically shown for the range extender.

In the figures, identical or functionally identical elements have been provided with the same reference numerals.

In FIG. 1, a fuel cell base module 10 is shown in a perspective view in a highly schematic manner. The fuel cell base module 10 comprises a pile 12, also called a stack, of a plurality of fuel cells connected in series and not designated in any more detail. The fuel cells comprise respective bipolar plates and respective so-called membrane electrode units. The fuel cell base module 10 also comprises a first end plate 14 and a second end plate 16, between which the stack 12 is arranged.

In addition, the fuel cell base module 10 comprises a plurality of interfaces, not shown here, for supplying hydrogen and air and for removing water and residual gas. It may be provided that only the first end plate 14 forms a kind of plug-and-play front end which has all interfaces. The fuel cell base module 10 is also assigned an air compressor 18, which serves to convey air and thus oxygen to the individual fuel cells. Contrary to the present illustration, however, it is not necessary for the air compressor 18 to be arranged directly on the basic fuel cell module 10. Instead, it can also be provided that the air compressor 18 is arranged at a completely different point during the installation in the motor vehicle in question than the fuel cell base module 10. It must only be assured that the air compressor 18 can convey air and thus oxygen to the basic fuel cell module 10 over an appropriate conduit or piping.

In FIG. 2, a plurality of the fuel cell base modules 10 are shown. To provide different powers and/or voltages, different numbers of the fuel cell base modules 10 can be electrically interconnected in different series and/or parallel circuits and configured with a media supply device, not shown here, to form respective variants of a range extender. Said media supply device, not shown here, is designed to supply air and hydrogen via the interfaces mentioned to the respective fuel cell base modules 10 and to discharge water and residual gas from the respective fuel cell base modules 10 via the interfaces.

In the present case, a plurality of groups 19 of fuel cell base modules 10 interconnected in series are shown schematically. For example, for each group 19, so many of the fuel cell base modules 10 can be interconnected in series that they can provide a voltage of, for example, 480 V and a power of 24 kW. Another interconnection is of course also possible. By connecting the individual groups 19 in parallel, it is possible to increase the power that can be provided while the voltage remains the same. In principle, any scaling of the power is possible for each application by means of a corresponding interconnection of the individual fuel cell base modules 10.

The individual fuel cell base modules 10 can have, for example, a reactive area of approximately 100 $cm^2$ and 80 individual fuel cells. Other areas and numbers are also possible. For example, it is possible that the respective fuel cell base modules 10 can provide an open circuit voltage of 80 V and a voltage of 48 V under full load, wherein the fuel cell base modules 10 can be designed, for example, to provide a power in the range of 2 to 8 kW. Other voltages and powers are also possible, in particular depending on the selected or installed membrane electrode units in the individual fuel cell base modules 10.

Above all, it can be provided that the fuel cell base modules 10 all have the same structure regarding their components. Hence, the fuel cell base modules 10 form highly standardized units in which the same components are installed everywhere. This enables high economies of scale to be achieved with correspondingly low purchasing and production costs. Hence, the individual fuel cell base modules 10, as well as the media supply device mentioned, together form a modular range extender system 20, wherein, depending on the boundary conditions or application, the standardized fuel cell base modules 10 are able to be interconnected in a wide variety of configurations. The fuel cell base modules 10 can each have their own controller, wherein, for example, these can be run on common hardware for a specific configured variant of a range extender.

In FIG. 3, a circuit arrangement 24 for an on-board network, not designated in any more detail, of an electrically driven motor vehicle is shown in a highly schematic manner. The circuit arrangement 24 comprises a predefined variant of a range extender 22 based on said modular range extender system 20. Furthermore, the circuit arrangement 24 comprises a high-voltage battery 26 for supplying energy to an electric engine 28 of the relevant motor vehicle. A frequency converter 30, which is assigned to the electric engine 28, is also shown schematically. The high-voltage battery 26 and the range extender 22 are interconnected without a direct current voltage converter in the form of a parallel circuit, wherein the range extender 22 is designed to charge the high-voltage battery 26.

A switching device 32 for establishing and separating an electrically conductive connection between the range extender 22 and the high-voltage battery 26 is also part of the circuit arrangement 24. The switching device 32 can be, for example, a MOSFET, a transistor or also a mechanical relay. One or more freewheeling diodes 34 can also be provided as safety elements. Because the circuit arrangement 24 does not have a direct current voltage converter, installation space and corresponding costs can be saved. By a correspondingly suitable predictive regulation or control can be ensured that when the range extender 22 is connected, it is nevertheless not damaged.

The circuit arrangement 24 also comprises a control device 36. The control device 36 is arranged and designed to operate the switching device 32 in order to connect the range extender 22 such that the range extender 22 is connected to the high-voltage battery 26 in an electrically conductive manner. In addition, the control device 36 can also actuate the switching device 32 in such a way that the electrically conductive connection between the range extender 22 and the high-voltage battery 26 is disconnected. In addition, a sensor device 38 and a system 40 for providing reactants and for regulating the temperature of the fuel cells of the range extender 22 are indicated schematically. The sensor device 38 and the system 40 do not have to belong to the circuit arrangement 24, but can partially or entirely be part of the circuit arrangement 24.

The control device 36 is arranged to carry out the following steps after it has received an activation signal relating to the range extender 22:

determining an operating point of the range extender 22 as a function of at least one quantity of the high-voltage battery 26;

defining a setpoint value relating to a supply of the reactants, that is, the hydrogen and the air, to the fuel cell base modules 10 (not shown here) of the range extender 22 and/or an operating temperature of the fuel cells of the range extender 22 based on the determined operating point the range extender 22;

controlling the system 40 designed for providing the reactants and/or for regulating the temperature of the fuel cells corresponding the respective defined setpoint value;

controlling the switching device 32 for connecting the range extender 22, only after the respective setpoint value relating to the supply of the reactants and/or the operating temperature has been reached.

Regarding the reactants, for example, respective volume flows of the hydrogen and the air to the fuel cell base modules 10 of the range extender 22 can be specified. The control device 36 can monitor these volume flows and only then switches the switching device 32 accordingly to connect the range extender 22; when the volume flows correspond to the specified setpoint values. The system 40 can, for example, have a plurality of sensors, not shown here, which are designed to monitor said volume flows of the hydrogen and the air and to transmit the relevant data to the control device 36. Based on these data, the control device 36 can determine a respective difference between an actual temperature of the fuel cells and the defined setpoint value relating to the operating temperature of the fuel cells and, depending on the determined difference, may set a temperature and/or a volume flow of a fluid of a temperature regulation device (not shown here) of the range extender 22. If the control device 36 determines, for example, that the difference between the respective actual temperature of the fuel cells and the defined setpoint value for the operating temperature of the fuel cells is particularly high, the control device 36 can set, for example, a particularly high volume flow regarding the fluid of the temperature regulation device and/or heat the fluid to a particularly high temperature. This makes it possible to produce the setpoint value relating to the operating temperature of the fuel cells particularly quickly.

The control device 36 can, for example, as a function of a voltage of the high-voltage battery 26, determine the operating point of the range extender 22. In addition, the control device 36 can, for example, also as a function of a charging state of the high-voltage battery 26, determine the operating point of the range extender 22. Knowing the voltage of the high-voltage battery 26 before the range extender 22 is connected is very important, since the circuit arrangement 24 does not have a direct current voltage converter that could compensate for any voltage differences between the range extender 22 and the high-voltage battery 26. The sensor device 38 can, for example, measure the voltage of the high-voltage battery 26 and, based on this, determine a current charging state of the high-voltage battery 26 and transmit the relevant data to the control device 36.

To determine the operating point of the range extender 22 before the range extender 22 is connected, the control device 36 can also determine an operating state of the high-voltage battery 26. Regarding the operating state of the high-voltage battery 26, the control device 36 can determine, for example, whether and how much the high-voltage battery 26 is currently being discharged or charged. The sensor device 38 can, for example, provide the control device 36 with corresponding data or information. If the high-voltage battery 26 is currently being charged, for example due to recuperation, the voltage applied to the high-voltage battery 26 differs from the case in which the high-voltage battery 26 is being discharged to provide power. Before connecting the range extender 22, it can therefore also be important to know the respective operating state of the high-voltage battery 26, in particular regarding a instantaneous discharge or charge. Based on this, the control device 36 can, still before the range extender 22 is connected, matched to the operating state of the high-voltage battery 26, determine the operating point of the range extender 22 and/or define said setpoint values.

The control device 36 can also be provided with data which characterise a route profile of a motor vehicle in which the circuit arrangement 24 is installed and/or a fleet profile of a plurality of motor vehicles. Based on this data, the control device 36 can evaluate how the high-voltage battery 26 has been used up to now and/or how it will be used in the future, in particular when it is likely to be charged or discharged. Knowing this data, the control device 36 can likewise determine the matching operating point of the range extender 22 and/or define said setpoint values. Data relating to the route profile of the motor vehicle can be provided to the control device 36, for example, by a navigation device of the motor vehicle, not shown here. Knowing this route profile, for example, further fleet profiles of vehicles that have travelled the same route can be retrieved. Based on the data from the fleet profiles, the control device 36 can estimate even more precisely when and how the high-voltage battery 26 is likely to be charged and discharged.

In addition, the control device 36 can also be provided with data which characterise a driving behaviour of a driver of the relevant motor vehicle in which the circuit arrangement 24 is installed. On the basis of these data which characterise the driving behaviour of the driver, the control device 36 can likewise determine the operating point of the range extender 22 and/or define said setpoint values. Knowing the driving behaviour of the driver, it is in particular possible to estimate his future driving behaviour, on which may largely depend how much the high-voltage battery 26 is discharged and/or recuperated.

The control device 36 can also set said setpoint values regarding the reactants to be provided and/or the operating temperature of the fuel cells higher by a specified amount than is necessary for the determined operating point of the range extender 22. Regarding the reactants, the control device 36 can therefore select an overstoechiometric specification for the point in time at which the range extender 22 is connected, such that after the range extender 22 is connected, more reactants are made available to it than is necessary for the determined operating point. The operating temperature of the fuel cells can also be selected to be somewhat higher, such that the resulting reactions within the fuel cells can take place faster than would be necessary for the determined operating point. This creates a type of buffer such that the range extender 22 can, if necessary, provide ad hoc more power for charging the high-voltage battery 26, if this should be necessary.

After the range extender 22 has been connected by appropriate activation of the switching device 32, the control device 36 can compare the previously determined operating point with an actually established operating point of the range extender 22 and, depending thereon, adjust the supply of the reactants to match the actual operating point. For example, the control device 36 can determine, based on a current intensity that characterises a current flowing from the range extender 22 to the high-voltage battery 26, the actual operating point of the range extender 22. After the range extender 22 has been connected, the control device 36 can also adjust or set, in particular the supply of the reactants, very quickly such that the actually setting operating point of the range extender 22 can be maintained, and without too much of the reactants being supplied.

The control device 36 can also determine a state of the fuel cell base modules 10 and specify different setpoint values for respective groups 19 (see FIG. 2) of fuel cell base modules 10 connected in parallel, depending on the state of their fuel cell base modules 10. This again takes place before the range extender 22 is connected. Regarding said state of the fuel cell base modules 10, the control device 36 can take into account, for example, a respective temperature and/or a respective aging state of the fuel cell base modules 10 of the range extender 22. In particular, the respective temperature of the fuel cells has a very strong influence on the reactions within the fuel cells and thus on their voltage development.

In FIG. 4, an electrically driven motor vehicle 42 is schematically shown. Part of the circuit arrangement 24 is also schematically shown. A plurality of the aforementioned air compressors 18 are also schematically shown. The air compressors 18 are assigned to the individual fuel cell base modules 10 (not shown) of the relevant or configured variant of the range extender 22. Via corresponding channels or conduits, the air compressors 18 can convey aspirated air to the individual fuel cell base modules 10. As already mentioned, the air compressors 18 do not have to be arranged directly on the fuel cell base modules 10. Instead, the air compressors 18 can be arranged at other suitable locations in the motor vehicle 42, in particular where the space conditions permit it particularly well and at the same time ambient air can be aspirated particularly well by means of the air compressor 18.

The individual fuel cell base modules 10 can in turn be arranged elsewhere in the motor vehicle 42, in view of a favourable vehicle centre of gravity and favourable packaging. The individual air compressors 18 can be combined, for example, in the form of a compressor module. Depending on the configuration of the range extender 22 and, above all, depending on the number of fuel cell base modules 10 installed therein, the number of air compressors 18 to be used may vary. The number of air compressors 18 corresponds exactly to the number of fuel cell base modules 10.

In FIG. 5 a diagram is shown in which an instantaneous power requirement P of the motor vehicle 42 over the time t, as well as an average power requirement $P_M$ of the motor vehicle 42 are schematically shown. The instantaneous power requirement P of the motor vehicle 42 may comprise, for example, a power requirement of the electric engine 28, as well as one or more auxiliary consumers of the motor vehicle 42. The secondary consumers may be, for example, an air conditioning device of the motor vehicle, i.e., for example, an air conditioning system, an infotainment system or any other consumers that are not directly used to drive the motor vehicle 42. Therefore, the average power requirement $P_M$ not only includes the pure power requirement of the electric engine 28 but also, for example, all the power requirements of all secondary consumers of the motor vehicle 42. Knowing the average power requirement $P_M$ can be used to design the range extender 22. The range extender 22 can be designed according to the following formula.

$$A_{BZ} = \frac{P_M}{Z_{BZ,R}} * J_{BZ,MEA},$$

wherein $A_{BZ}$ denotes a reactive area of all fuel cells of the range extender 22, $P_M$ denotes an average specified power requirement of the motor vehicle 42;

$J_{BZ,MEA}$ denotes a maximum permissible current density of the respective membrane-electrode units of the range extender 22.

The reactive area $A_{BZ}$ of all fuel cells of the range extender 22 can therefore be designed taking into account the average power requirement $P_M$ and the specified maximum permitted current density $J_{BZ,MEA}$ of the respective membrane electrode units of the range extender 22.

Additionally or alternatively, the range-extender 22 may also be designed according to the following formula:

$$Z_{BZ,R} = \frac{Z_{Bat,R} * U_{Z,Bat,min}}{U_{Z,BZ,VL}},$$

wherein $Z_{BZ,R}$ denoted the number of all in series connected fuel cells of the range extender 22, $Z_{Bat,R}$ denotes the number of all in series connected battery cells of the high-voltage battery 26, $U_{Z,BZ,VL}$ denotes a minimum permissible cell voltage of the high-voltage battery 26 during operation, $U_{Z,BZ,VL}$ denotes a fuel cell operating voltage at cell level at full load.

The number $Z_{BZ,R}$ of all in series connected fuel cells of the range extender 22 is calculated according to the formula depending on the number $Z_{Bat,R}$ of all in series connected battery cells of the high-voltage battery 26, the minimum permissible cell voltage $U_{Z,Bat,min}$ of the high-voltage battery 26 in operation, as well as the fuel cell operating voltage $U_{Z,BZ,VL}$ set at cell level. As a result, the range extender 22 can be designed to be particularly well matched to the high-voltage battery 26. Among other things, this can ensure that, when the range extender 22 is connected, it can reliably provide at least approximately the same voltage level as the high-voltage battery 26 and can also charge it to a sufficient extent.

By designing the range extender 22 in accordance with the two above-mentioned formulas, it can also be ensured that the range extender 22 is neither oversized nor undersized.

In FIG. 6, a diagram is shown in which a profile of the charging state SoC of the high-voltage battery 26 is shown over time t. In the case schematically indicated here, it can be assumed, for example, that the high-voltage battery 26 is discharged more or less continuously. Of course, the charging state SoC can also increase again during operation, for example when the high-voltage battery 26 is charged by recuperation and/or by connecting the range extender 22. In addition, a possible area B, which can be suitable for connecting the range extender 22, is indicated schematically.

In FIG. 7, a diagram is shown in which, when the range extender 22 is connected, the respective curves of a voltage $U_{REX}$ of the range extender 22 and a power output $P_{REX}$ of the range extender 22 to the high-voltage battery 26 via a current $I_{REX}$ flowing from the range extender 22 to the high-voltage battery 26, are plotted. The area B for connecting the range extender 22 is again schematically shown. Due to the parallel connection of the range extender 22 to the high-voltage battery 26 without a direct current voltage converter, the voltage $U_{REX}$ of the range extender 22 and the voltage U of the high-voltage battery 26 automatically adapt to one another when the range extender 22 is connected.

On the basis of the present diagram, it can be seen how the power output $P_{REX}$ of the range extender 22 to the high-voltage battery 26 can vary, depending on when the range extender 22 is connected. In other words, the diagram shown here depicts different possible operating points of the range extender 22. This operating point of the range extender 22 in turn depends—as already mentioned before—significantly on the different quantities of the high-voltage battery 26. Therefore, before connecting the range extender 22, it is important that the control device 36, in the manner already explained, accurately determines or estimates the operating point of the range extender 22 as a function of as many quantities of the high-voltage battery 26 as possible. As a function of the determined operating point, said setpoint values relating to the supply of the reactants to the fuel cell base modules 10 of the range extender 22 and/or an operating temperature of the fuel cells of the range extender 22 are defined. By appropriately controlling the system 40 by the control device 36, it can be ensured that at the point in time the range extender 22 is connected, it is also provided with sufficient reactants and/or has the required operating temperature, such that the range extender 22 can be operated immediately in the previously determined operating point. Because the switching device 32 is only then activated to connect the range extender 22 by means of the control device 36, when the respective setpoint value relating to the supply of the reactants and/or the operating temperature of the fuel cells has been reached.

Since there is no direct current voltage converter between the range extender 22 and the high-voltage battery 26, is important, at the point in time the range extender 22 is connected, that the range extender 22 has sufficient reactants available to be able to operate at the operating point, previously determined as precisely as possible. For example, after the range extender 22 has been connected, it can be prevented that hotspots within the range extender 22 arise and/or that the range extender 22 cannot provide sufficient power to charge the high-voltage battery 26.

Because the control device 36 estimates or determines the operating point of the range extender 22 before it is connected particularly precisely in the manner described, it can be operated particularly gently after it has been connected. Without the explained procedure of the control device 36, it would be very likely that the range extender 22 would be damaged after only a few connection operations—due to the absence of the direct current voltage converter and the parallel connection to the high-voltage battery 26. This can be prevented by the aforementioned procedure. It is thus possible to use the range extender 22 to extend the range of the motor vehicle 42 even without a direct current voltage converter.

LIST OF REFERENCE NUMERALS

10 fuel cell basic module
12 stack of fuel cells connected in series
14 first end plate
16 second end plate
18 air compressor
19 groups of fuel cell base modules connected in series
20 modular range extender system
22 variant of a range extender
24 circuit arrangement
26 high-voltage battery
28 electric engine
30 frequency converter
32 switching device
34 freewheeling diode
36 control device
38 sensor device
40 system for providing reactants and for controlling the temperature of the fuel cells
42 motor vehicle
$A_{BZ}$ reactive area of all fuel cells of the range extender
B range for connecting the range extender
$I_{REX}$ current flowing from the range extender to the high-voltage battery
$J_{BZ,MEA}$ maximum permissible current density of the respective membrane electrode units of the range extender
P instantaneous power requirement of the motor vehicle
$P_M$ average specified power requirement of the motor vehicle
$P_{REX}$ power output of the range extender to the high-voltage battery
SoC charging state of the high-voltage battery
t time
U voltage of the high-voltage battery
$U_{REX}$ voltage of the range extender
$U_{Z,Bat,min}$ minimum permissible cell voltage of the high-voltage battery during operation
$U_{Z,BZ,VL}$ fuel cell operating voltage at cell level at full load
$Z_{Bat,R}$ number of all in series connected battery cells of the high-voltage battery
$Z_{BZ,R}$ number of all in series connected fuel cells of the range extender

We claim:

1. A circuit arrangement for an on-board network of an electrically driven motor vehicle, comprising
   a high-voltage battery for supplying energy to an electrical engine of the motor vehicle;
   a range extender designed for charging the high-voltage battery, having a plurality of identical fuel cell base modules each with a plurality of fuel cells connected in series and interfaces for supplying reactants in the form of hydrogen and air;
   a switching device for connecting the range extender, wherein the switching device is designed to interconnect the high-voltage battery and the range extender in an electrically conductive manner without a direct current voltage converter in the form of a parallel circuit;

a control device which is designed to carry out the following steps after it has received an activation signal relating to the range extender:

determining an operating point of the range extender as a function of at least one quantity of the high-voltage battery;

defining a setpoint value relating to a supply of the reactants to the fuel cell base modules and/or an operating temperature of the fuel cells based on the determined operating point;

controlling a system designed for providing the reactants corresponding to the defined setpoint value, if the setpoint value relates to the supply of the reactants, and controlling a system designed to control the temperature of the fuel cells in accordance with the defined setpoint value, if the set-point value relates to the operating temperature;

controlling the switching device for connecting the range extender, only after the setpoint value relating to the supply of the reactants has been reached, if the setpoint value relates only to the supply of the reactants;

controlling the switching device for connecting the range extender, only after the setpoint value relating to the operating temperature has been reached, if the setpoint value only relates to the operating temperature;

controlling the switching device for connecting the range extender, only after the setpoint value relating to the supply of the reactants and/or the operating temperature has been reached, if the setpoint value relates to the supply of the reactants and the operating temperature.

2. The circuit arrangement according to claim 1, characterised in that the control device is designed to monitor the respective volume flows of the hydrogen and the air to the fuel cell base modules and only then to control the switching device for connecting the range extender when the volume flows correspond to the specified setpoint values.

3. The circuit arrangement according to claim 1, characterised in that the control device is designed to determine a respective difference between an actual temperature of the fuel cells and the defined setpoint value relating to the operating temperature of the fuel cells and, as a function of the determined difference, to set a temperature and/or a volume flow of a fluid of a temperature regulation device of the range-extender.

4. The circuit arrangement according to claim 1, wherein the control device is designed, as a function of a voltage of the high-voltage battery, to determine the operating point of the range extender.

5. The circuit arrangement according to claim 1, wherein the control device is designed, as a function of a charging state of the high-voltage battery, to determine the operating point of the range extender.

6. The circuit arrangement according claim 1, wherein the control device is designed, as a function of an operating state of the high-voltage battery, to determine the operating point of the range extender and/or to define the setpoint values.

7. The circuit arrangement according to claim 6, wherein the control device is designed, regarding the operating state of the high-voltage battery, to determine whether and how much the high-voltage battery is being discharged or charged.

8. The circuit arrangement according to claim 1, wherein the control device is designed, as a function of data characterising a route profile of the motor vehicle and/or a fleet profile of a plurality of motor vehicles, to determine the operating point of the range extender and/or to define the setpoint values.

9. The circuit arrangement according to claim 1, wherein the control device is designed, as a function of data characterising the driving behaviour of a driver of the motor vehicle, to determine the operating point of the range extender and/or to define the setpoint values.

10. The circuit arrangement according to claim 1, wherein the control device is designed to set the setpoint values relating to the reactants by a specified amount higher than is necessary for the determined operating point of the range extender.

11. The circuit arrangement according to claim 1, wherein the control device is designed, after the range extender has been connected, to compare the previously determined operating point with an actually setting operating point of the range extender and, as a function thereof, to adjust the supply of hydrogen and air matched to the actual operating point that is being set.

12. The circuit arrangement according to claim 11, wherein the control device is designed, based on a current intensity, which characterises a current flowing from the range extender to the high-voltage battery to determine the actual operating point of the range extender that is being set.

13. The circuit arrangement according to claim 1, wherein the control device is designed to determine a state of the fuel cell base modules and to specify different setpoint values for respective groups of fuel cell base modules connected in parallel, depending on the state of their fuel cell base modules.

14. The circuit arrangement according to claim 13, wherein the state comprises a respective temperature and/or a respective aging state of the fuel cell base modules.

15. The circuit arrangement according to claim 1, wherein the range extender is designed according to the following formula:

$$Z_{BZ,R} = \frac{Z_{Bat,R} * U_{Z,Bat,min}}{U_{Z,BZ,VL}},$$

wherein $Z_{BZ,R}$ denotes the number of all in series connected fuel cells of the range extender, $Z_{Bat,R}$ denotes the number of all in series connected battery cells of the high-voltage battery, $U_{Z,Bat,min}$ denotes a minimum permissible cell voltage of the high-voltage battery during operation, $U_{Z,BZ,VL}$ denotes a fuel cell operating voltage at cell level at full load.

16. The circuit arrangement according to claim 1, wherein the range extender is designed according to the following formula:

$$A_{BZ} = \frac{P_M}{Z_{BZ,R}} * J_{BZ,MEA},$$

wherein $A_{BZ}$ denotes a reactive area of all fuel cells of the range extender, $P_M$ denotes an average specified power requirement of the motor vehicle, $J_{BZ,MEA}$ denotes a maximum permissible current density of the respective membrane-electrode units of the range extender.

17. The circuit arrangement according to claim 16, wherein the average specified power requirement (PM) of the motor vehicle comprises an average power requirement of the engine of the motor vehicle for a specified driving profile of the motor vehicle and at least one auxiliary consumer of the motor vehicle, in particular an air conditioning device of the motor vehicle.

18. An electrically driven motor vehicle with a circuit arrangement according to claim 1.

19. A method for operating a circuit arrangement according to claim 1, in which the control device of the circuit arrangement carries out the following steps after it has received an activation signal relating to the range extender:
   determining an operating point of the range extender as a function of at least one quantity of the high-voltage battery;
   defining a setpoint value relating to a supply of the reactants to the fuel cell base modules and/or an operating temperature of the fuel cells based on the determined operating point;
   controlling a system designed for providing the reactants corresponding to the defined setpoint value, if the setpoint value relates to the supply of the reactants, and controlling a system designed to control the temperature of the fuel cells in accordance with the defined setpoint value, if the setpoint value relates to the operating temperature;
   controlling the switching device for connecting the range extender, only after the setpoint value relating to the supply of the reactants has been reached, if the setpoint value relates only to the supply of the reactants;
   controlling the switching device for connecting the range extender, only after the setpoint value relating to the operating temperature has been reached, if the setpoint value only relates to the operating temperature;
   controlling the switching device for connecting the range extender, only after the setpoint value relating to the supply of the reactants and/or the operating temperature has been reached, if the setpoint value relates to the supply of the reactants and the operating temperature.

* * * * *